(12) United States Patent
Saraswati et al.

(10) Patent No.: US 7,971,031 B2
(45) Date of Patent: Jun. 28, 2011

(54) DATA PROCESSING SYSTEM AND METHOD

(75) Inventors: Sujoy Saraswati, Karnataka (IN);
Teresa Johnson, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1064 days.

(21) Appl. No.: 11/754,391

(22) Filed: May 29, 2007

(65) Prior Publication Data
US 2009/0077350 A1 Mar. 19, 2009

(51) Int. Cl.
*G06F 9/312* (2006.01)
*G06F 12/02* (2006.01)
(52) U.S. Cl. .......... 712/207; 711/140
(58) Field of Classification Search .......... 712/207; 711/140
See application file for complete search history.

(56) References Cited

U.S. PATENT DOCUMENTS

| 6,421,826 | B1 * | 7/2002 | Kosche et al. ............ 717/161 |
| 6,951,015 | B2 * | 9/2005 | Thompson ............... 717/158 |
| 6,961,930 | B1 * | 11/2005 | Waldspurger et al. ..... 717/141 |
| 2003/0126591 | A1 * | 7/2003 | Wu et al. ................ 717/158 |

OTHER PUBLICATIONS ftp://download.intel.com/design/Itanium2/manuals/25111003.pdf.
ftp://download.intel.com/design/Itanium/manuals/24531705.pdf.
ftp://download.intel.com/design/Itanium2/manuals/24531805.pdf.
ftp://download.intel.com/design/Itanium2/manuals/24531905.pdf.
http://download.intel.com/design/Itanium2/manuals/30806501.pdf.

* cited by examiner

*Primary Examiner* — Daniel Pan (57) ABSTRACT

A method, system and computer program for modifying an executing application, comprising monitoring the executing application to identify at least one of a hot load instruction, a hot store instruction and an active prefetch instruction that contributes to cache congestion; where the monitoring identifies a hot load instruction, enabling at least one prefetch associated with the hot load instruction; where the monitoring identifies a hot store instruction, enabling at least one prefetch associated with the hot store instruction; and where the monitoring identifies an active prefetch instruction that contributes to cache congestion, one of disabling the active prefetch instruction and reducing the effectiveness of the active prefetch instruction.

19 Claims, 5 Drawing Sheets

DATA PROCESSING SYSTEM AND METHOD

BACKGROUND TO THE INVENTION

An application executing on a data processing system may access the memory of the data processing system. If there are many memory accesses, the application may suffer performance degradation as the application waits for a cache memory to be populated with relevant cache lines. Some data processor architectures allow prefetches to be used which request that memory is preloaded into the cache before it is used by the application. However, prefetches can sometimes cause performance degradation by increasing memory traffic.

It is an object of embodiments of the invention to at least mitigate one or more of the problems of the prior art.

BRIEF DESCRIPTION OF THE DRAWINGS

Embodiments of the invention will now be described by way of example only, with reference to the accompanying drawings, in which.

DETAILED DESCRIPTION OF EMBODIMENTS OF THE INVENTION

Embodiments of the invention provide a method of modifying an executing application, that is, an application that is executing on a data processing system, by monitoring the executing application and modifying instructions within the executing application. The aim of the modifying is to improve the efficiency of the memory accesses of the application and therefore improve performance (such as, for example, CPU utilization and/or throughput) of the application. An executing application may be, for example, one or more threads and/or processes that are executing on a data processing system.

The executing application includes prefetches associated with load and store instructions. For example, a load instruction may access a memory location. A prefetch instruction associated with the load instruction is encountered before the load instruction, and aims to ensure that the memory location is within the cache of a data processor before the load instruction is executed. The memory location may or may not be within the cache before the load instruction is executed. As a result of the prefetch instruction, the memory location will be in the data processor's cache before the load instruction is executed, or at least a request to move the memory location into the cache is made before the load instruction is executed, and as a result the latency of the load instruction may be reduced. Similarly, the latency of a store instruction may be reduced by using prefetches. The latency of an instruction is the number of clock cycles of a data processor required to complete the execution of the instruction.

Embodiments of the invention monitor the executing application to identify "hot" loads and stores within the executing application. A "hot" load is a load that has a high latency. For example, during a period, a hot load instruction may contribute a certain percentage or higher of the total latency of all load instruction executed by the application during the period. Similarly, a hot store instruction may contribute a certain percentage or higher of the total latency of all store instructions executed by the application during the period. Embodiments of the invention enable prefetches associated with the hot loads and/or stores to attempt to reduce the latencies of the load and/or store instructions executed by the application.

Too many prefetches or over aggressive prefetching may degrade the performance of the application by causing too much memory traffic, and thus, for example, causing cache congestion. Embodiments of the invention monitor the executing application to identify prefetches that contribute to cache congestion. If any such prefetches are identified, then the prefetches are modified such that they are less effective. For example, the prefetches may be modified such that a memory location prefetched is loaded into a cache level other than the highest cache level. If any such prefetches are identified that are already less effective, then these prefetches are disabled by embodiments of the invention.

Figure 1:
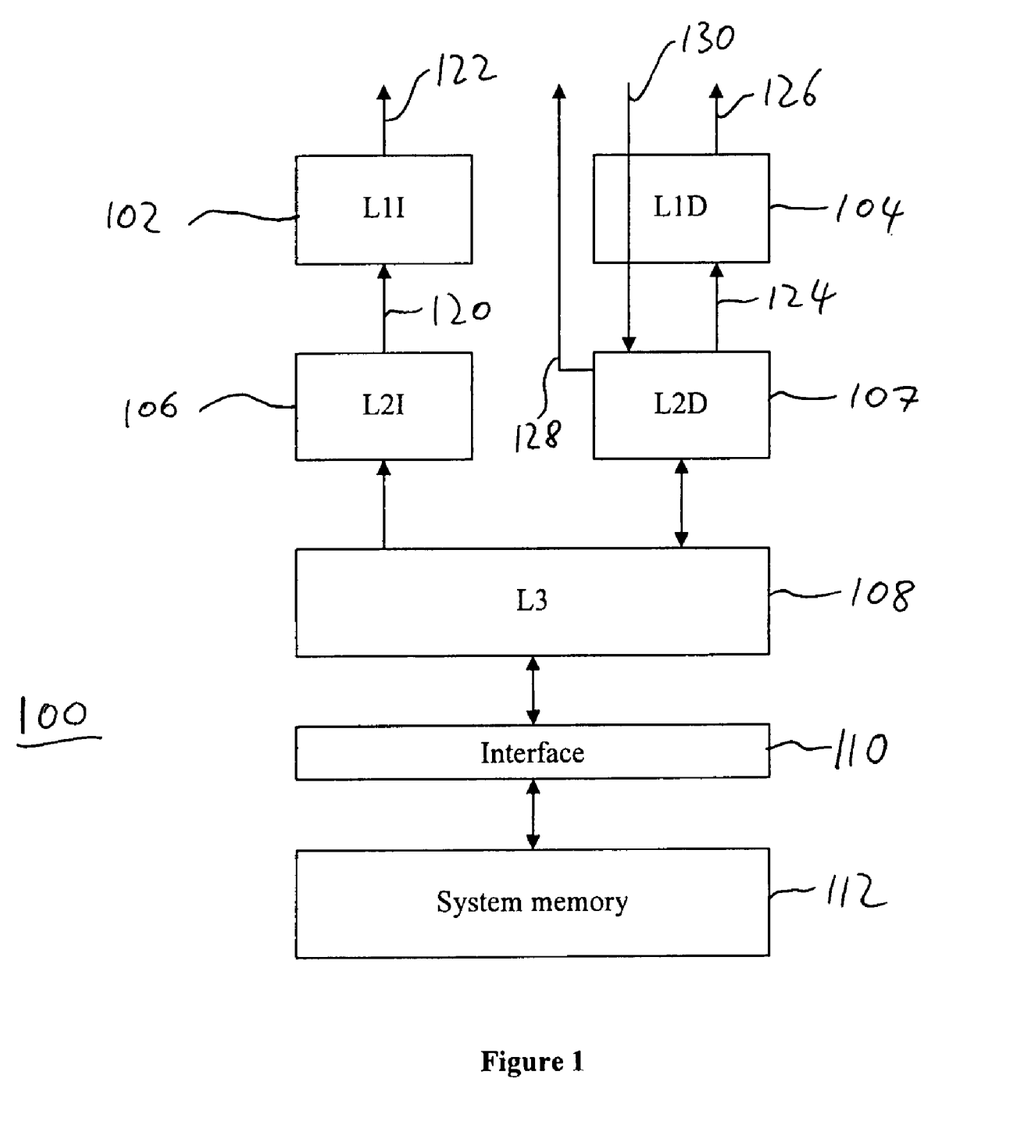
FIG. 1 shows an example of a cache memory architecture.

FIG. 1 shows an example of a cache memory architecture 100. The cache memory architecture 100 belongs to the member of the Intel® Itanium® 2 data processor known as "Montecito", although other data processors, and therefore other cache memory architectures, may be used in alternative embodiments of the invention. The architecture 100 includes a level 1 instruction (L1I) cache 102 that stores instructions to be executed by the data processor, and a level 1 data (L1D) cache 104 that stores data that is accessed (for example, loaded and/or stored) by the data processor. The cache memory architecture 100 also includes a level 2 instruction (L1I) cache 106 and a level 2 data (L2D) cache 107. The L1 caches (L1I and L1D) 102 and 104 are 16 Kbyte 4-way set-associated caches with a line size of 64 bytes. That is, memory is loaded into the L1 caches in 64 byte blocks (lines), and each line may be located in one of four places in the cache. The location of the four places depends on the location of the line in the system memory. The L2I cache 106 is a 1 Mbyte 8-way set associative cache with a line size of 128 bytes. The L2D cache 107 is a 256 Kbyte 8-way set associative cache with a line size of 128 bytes.

The cache architecture 100 includes a level 3 (L3) cache 108, and an interface 110 such that instructions and data can be loaded into the cache from a system memory 112. The system memory 112 (for example, RAM) is not part of the cache memory architecture 100.

Instructions can be loaded into the L1I cache 102 from the L2I cache 106 as indicated by the arrow 120. Instructions can be read from the L1I cache 102 by the data processor for executing as indicated by the arrow 122. Data can be loaded into the L1D cache 104 from the L2D cache 107 as indicated by the arrow 124. Data can then be read from the L1D cache 104 by the data processor as indicated by the arrow 126. Floating-point loads, which load floating-point data from the cache memory, load the data directly from the L2D cache 107 as indicated by the arrow 128. Requests to read data that cannot be satisfied by the L1D cache 104 are stored in an L2D OzQ (not shown) that can store up to 32 requests.

The L1D cache is a write-through cache. Stores by the data processor are written directly to the L2D cache 107 as indicated by the arrow 130. If the memory location written to is present in the L1D cache 104, then the L1D cache 104 is also updated to reflect the stored data.

More information relating to the cache memory architecture 100 and other Intel® Itanium® architecture considerations, such as, for example, programming of a performance monitoring unit (PMU), can be found in the following documents:

ftp://download.intel.com/design/Itanium2/manuals/23111003.pdf;
ftp://download.intel.com/design/Itanium/manuals/24531705.pdf;
ftp://download.intel.com/design/Itanium/manuals/24531805.pdf;
ftp://download.intel.com/design/Itanium/manuals/24531905.pdf; and
http://download.intel.com/design/Itanium2/manuals/30806501.pdf. The contents of these documents are incorporated herein in their entirety by reference for all purposes.

Embodiments of the invention provide a monitor application (such as, for example, at least one process and/or thread) that executes on the data processing system alongside the executing application and monitors the executing application. The monitor application, for example, may be invoked by the executing application when the executing application is invoked, or it may be invoked separately. The monitor application monitors the executing application and modifies the executing application according to embodiments of the invention.

Figure 2:
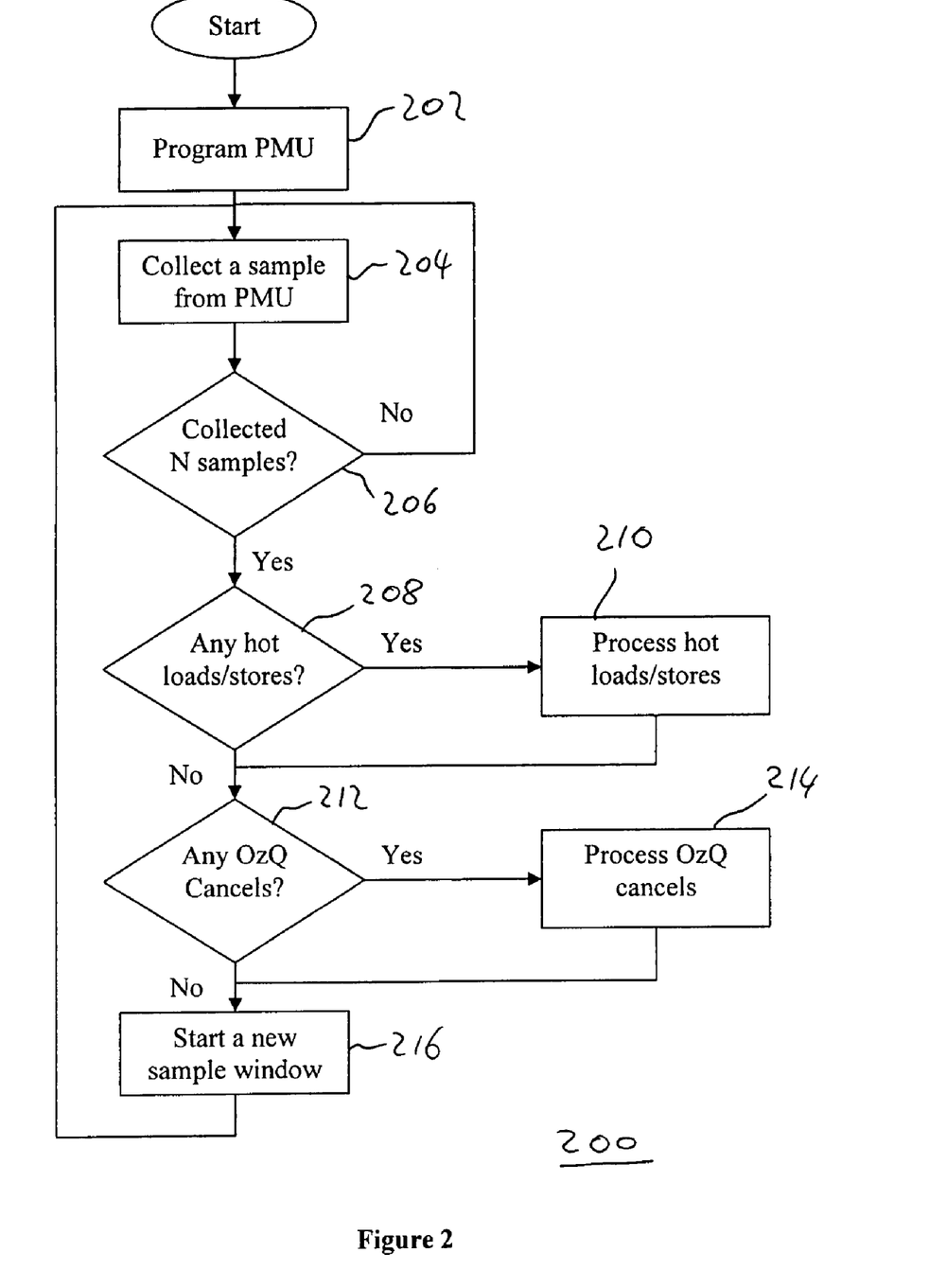
FIG. 2 shows an example of a method of modifying an executing application according to embodiments of the invention.

FIG. 2 shows an example of a method 200 of modifying the executing application according to embodiments of the invention. The method 200 starts at step 202 where a performance monitor is programmed. The performance monitor provides information relating to the executing application that can be used to modify the executing application. For example, if the data processing system includes an Intel® Itanium® data processor, then the performance monitoring unit (PMU) of the data processor may be used. The performance monitor is programmed to provide information relating to the behaviour of the cache of the data processor that is executing the executing application.

Each of the cache misses could be avoided, or the latency of the corresponding load/store instructions reduced, by enabling a prefetch associated with the corresponding load/store instruction. The OzQ cancels could be avoided or reduced by reducing the effectiveness of or disabling one or more prefetches.

The PMU of an Intel® Itanium® data processor can be programmed using performance monitor configuration (PMC) registers. For example, the data processor can be programmed such that events due to L2D cache read misses, L2D TLB misses, L3 cache store misses and OzQ cancels can be captured by the PMU and their details recorded.

For example, the PMU can be programmed such that a data event address register (DEAR) or the PMU provides details of L2D cache load misses and L2D TLB misses. Where the executing application is executing on the member of the Intel® Itanium® data processor family known as "Montecito", the register $PMC_{40}$ can be used to program the PMU to detect instructions executing on the data processor that cause a DATA_EAR_EVENTS event, thus indicating a L2D cache load miss or L2D TLB miss. A load latency threshold (number of clock cycles) can be defined with $PMC_{40}$, such that only load instructions with a latency above this threshold are detected by the PMU. Addresses of the instruction (the instruction pointer IP address) and accessed data and the latency of the instruction are captured within performance monitor data (PMD) registers $PMD_{32}$, $PMD_{33}$ and $PMD_{36}$. The PMU can only monitor one load at a time, and the selection of the load to monitor is randomized by the PMU so a statistical sample of loads that miss the L2D cache is provided by the PMU. Once the PMU knows whether the monitored load is a cache hit or miss, and information on the miss (if any) is recorded, the PMU can monitor another load. In embodiments of the invention, L1D cache misses are not monitored as accesses to the L1D cache are generally very fast and FP loads are not loaded from the L1D cache. However, in alternative embodiments of the invention, L1D cache misses could also be monitored.

The PMU can be used to capture store instructions that miss the L2D and L3 cache levels by programming $PMC_{42}$ of the PMU such that the execution trace buffer (ETB) operates in instruction pointer address capture (IP-EAR) mode, and PMC4 or PMC6 is programmed to monitor the L3_WRITES.DATA_WRITE.MISS event. This causes the PMU to detect when a store instruction misses all levels of the cache. The IP-EAR operates by capturing the instruction pointer (IP) of all retired (executed) instructions in ETB registers $PMD_{48-63}$, and the latency of the instruction (i.e., the number of clock cycles between retirement of instructions). When there is a PMU freeze due to an event, the IP-EAR continues to capture IPs of retired instructions for a certain number of cycles following the PMU freeze. This number is programmed into 8 bits of $PMC_{42}$. Thus, the IPs of the instruction that caused the event and some instructions following the event are captured in the IP-EAR. The PMU is programmed such that the instruction that caused the event is retired and captured in the IP-EAR, but the number of cycles before the IP-EAR is small enough to ensure that the instruction stays within the IP-EAR before it freezes. The IP-EAR can then be interrogated to determine which instruction caused the L3_WRITES.DATA_WRITE.MISS event. The event occurred a programmable number of cycles before the IP-EAR freeze. The latency values of the most recent instructions in the IP-EAR are examined and totaled to determine which instruction was executing at the time of the event. The instruction that was executing is the instruction that causes the total of the latencies to cross the programmable delay value.

For example, the IP-EAR may freeze 20 clock cycles after the L3_WRITES.DATA_WRITE.MISS event causes the PMU to freeze. Where the most recent instruction has a latency of 4 clock cycles, and the previous instruction had a latency of 6 clock cycles, and the previous instruction had a latency of 8 clock cycles, and the previous instruction had a latency of 5 clock cycles, it is assumed that the instruction with a latency of 5 clock cycles caused the event, as the total latency of the most recent instructions crosses 20 clock cycles when including this instruction. The instruction pointer (IP) of this instruction can then be determined from the IP-EAR. This approach may provide an incorrect instruction. However, it is known that the instruction should be a store instruction. Therefore, a small window around the instruction (for example, 2 or 3 instructions before and/or after the instruction) is considered to look for a store instruction which caused the event.

The PMU can also be programmed to capture L2D cache OzQ cancels, where a request is made that must be stored in the L2D OzQ, but the OzQ is full. For example, PMC4 or PMC6 can be used to program the PMU to monitor the L2D_OZQ_CANCELS1.ANY events. The IP of the instruction that caused the event can be determined from the IP-EAR in the same manner as for the L3_WRITES.DATA_WRITE.MISS event above.

The PMU is programmed such that details of an event are captured and the PMU freezes once a certain number of that event has been detected. For example, the PMU is programmed such that after S DATA_EAR_EVENTS events, where S is an integer, the PMU freezes and provides details of the last instruction that caused the DATA_EAR_EVENTS event. The PMU does not monitor events while frozen. The monitoring application can then take the sample by reading the details, and unfreeze the PMU such that it monitors further events. In embodiments of the invention, the PMU freezes after 10,000 DATA_EAR_EVENTS events, the PMU freezes after 100 L3_WRITES.DATA_WRITES.MISS events, with 5% variation. In embodiments of the invention, the PMU freezes after 10,000 L2D_OZQ_CANCELS1.ANY events, with 5% variation.

In embodiments of the invention, where the executing application and monitoring application are executing on a member of the Intel® Itanium® data processor family known as "McKinley", PMC11 is programmed to count data cache misses, PMC4 is programmed to count DATA_E-AR_EVENTS events, PMD4 is programmed with an overflow value such that, for example, PMD4 overflows after S DATA_EAR_EVENTS and data is captured in PMD2, PMD3 and PMD17.

In embodiments of the invention where the "Montecito" data processor is used, PMC40 is programmed to monitor data cache misses. One of PMC4-9 (and corresponding register PMD4-9) is used to monitor DATA_EAR_EVENTS and overflow to collect data in registers PMD32, PMD33 and PMD36. The IP-EAR is configured as above. One of PMC4-9 (and corresponding PMD4-9) is used to monitor L3_WRITES.DATA_WRITE.MISS events, and another is used to monitor L2D_OZQ_CANCELS1.ANY events. The IA64_INST_RETIRED count is monitored by another of PMC4-9 (and corresponding PMD4-9) to count the number of instructions retired.

Referring back to the method 200 of FIG. 2, once the PMU has been programmed as above, the method 200 moves from step 202 to step 204 where a sample is collected from the PMU, and the PMU is unfrozen. Step 204 occurs where a predetermined number of events of a particular type (such as, for example, a number S of L2D_MISSES events) have occurred. Perfmon, for example, can be used to extract sample information from the PMU. perfmon( ) is a system call provided by, for example, the HP-UX operating system that can be used to program the PMU and/or receive data from the PMU.

Once a sample has been collected from the PMU in step 204, the method 200 continues from step 206 where it is determined whether N samples have been collected from the PMU. If this is not the case, then the method 200 returns to step 204 where a further sample is collected from the PMU when it is available. If N samples have been collected, however, then the method 200 proceeds from step 206 to step 208 where it is determined whether there are any hot stores within the application as identified by the N samples collected. The N samples are interrogated to determine the total latency of all load and store instructions that missed the L1D or L2D cache and that are identified within the samples. Then, the N samples are interrogated to determine, for example, any load instructions that caused at least 5% of the total latency of load instructions. These load instructions are "hot loads". Similarly, the N samples are interrogated to determine, for example, any store instructions that caused at least 5% of the total latency of store instructions. These store instructions are "hot loads". In alternative embodiments, the requirements for identifying hot load and hot store instructions may be different.

If any hot loads or stores are identified in step 208, then the method 200 proceeds to step 210 where the hot loads and stores are processed. This is explained in more detail later in this document with reference to FIG. 3. The method 200 then continues to step 212. If no hot loads are identified in step 208, then the method 200 proceeds from step 208 to step 212.

In step 212, the N samples are interrogated to determine whether there is cache congestion, indicated by excessive OzQ cancels events. The PMU is used to determine the number of instructions retired during the last sample window, that is, during the time the N samples were collected. If the L2D_OZQ_CANCELS1.ANY events cross a threshold, such as, for example, M % of instructions retired (where M is, for example, 5), then the N samples are examined to determine if there are any IP addresses that cause more than Z % of the OzQ cancels events (where Z is, for example, 5). If there are such IP addresses, then the instructions at these IP addresses contribute to cache congestion, and the method 200 proceeds from step 212 to step 214 where each IP address causing more than Z % of the OzQ cancels events is processed, as described in more detail later with reference to FIG. 5. The method 200 then continues from step 216. If in step 212 it is determined that no instructions cause more than Z % of the OzQ cancels, or the number of OzQ cancels is less than M % of the instructions retired, then the method proceeds from step 212 to step 216. In other embodiments of the invention, other criteria may be used to determine if there is cache congestion and to determine which IP addresses contribute to cache congestion.

In step 216, the sample window of N samples is discarded and a new sample window is created. The method 200 then returns to step 204 where more samples are collected from the PMU.

Figure 3:
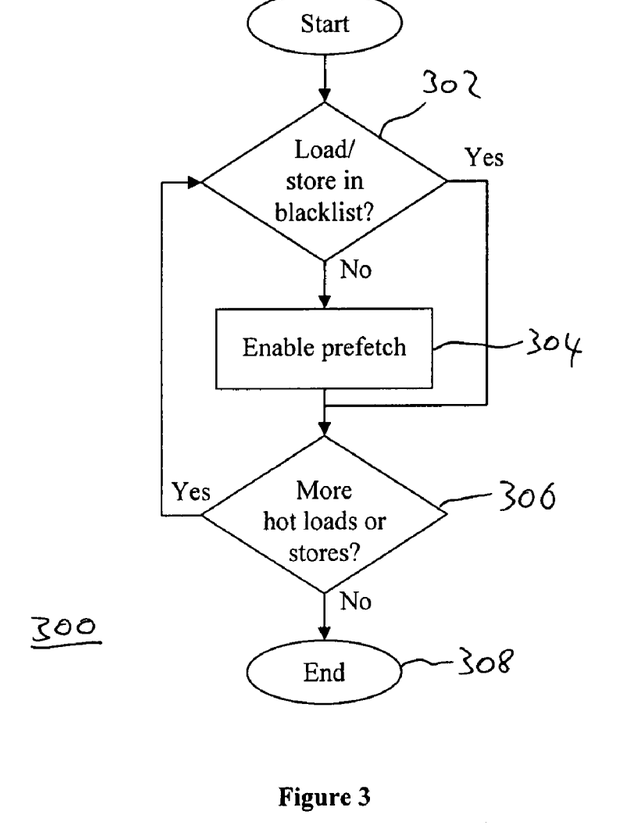
FIG. 3 shows an example of a method of processing hot loads and/or stores.

FIG. 3 shows an example of a method 300 for processing hot loads and stored identified in the method 200 of FIG. 2. The method 300 starts at step 302 where it is determined whether an identified hot load or store is found in a blacklist. The blacklist is a list of prefetches that must not be enabled as they contribute to cache congestion. Prefetches are added to the blacklist as explained later with reference to FIG. 5.

Figure 4:
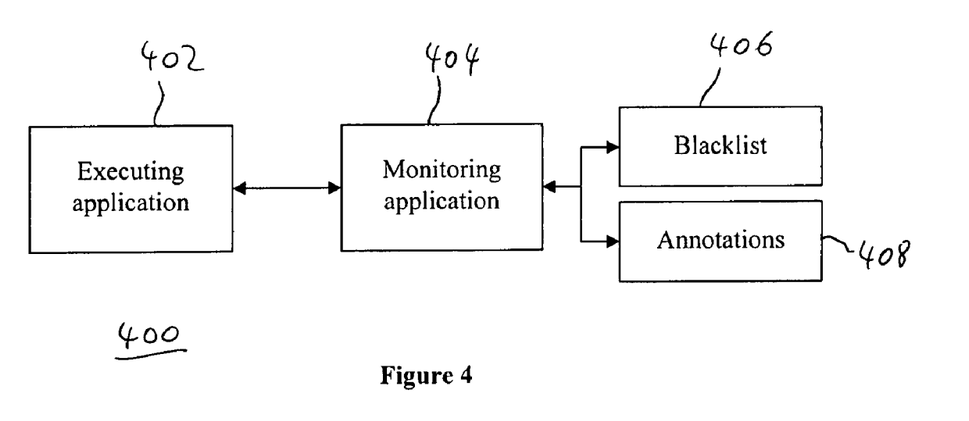
FIG. 4 shows an example of a system for modifying an executing application.

FIG. 4 shows a system 400 for monitoring an executing application 402 and modifying the executing application 402 according to embodiments of the invention. The monitoring application 404 monitors the executing application 402 and modifies it according to the monitoring. The monitoring application 404 has access to the blacklist 406 which the monitoring application 404 uses to determine any prefetches within the executing application 402 that should not be enabled. The monitoring application 408 also has access to annotations 408. The annotations 408 contain a list of indications (for example, IP addresses) of instructions in the executing application, and a list of indications of the prefetches associated with the instructions. For example, where an instruction is associated with a prefetch instruction located elsewhere in the executing application, the annotations 408 provide an indication (for example, the IP address) of the prefetch instruction. Where an instruction is to be modified to enable or disable its corresponding prefetch, the annotations 408 provide an indication of how the instruction is to be modified. The annotations 408 are present to reduce the overhead incurred by the monitoring application 404 when determining which prefetch to enable when, for example, hot loads and/or stores are found, although in other embodiments of the invention the annotations 408 may not be used. The annotations 408 may be provided, for example, by a complier (not shown) of the executing application, where the compiler generates the instructions in the executing application 402 and their corresponding prefetches.

Referring back to FIG. 3, if a hot load or store is not in the blacklist 406, then the method 400 continues from step 304 where a prefetch corresponding to the hot load or store is enabled. The monitoring application (for example) consults the annotations 408 to determine the prefetch corresponding to the hot load or store instruction, if any. The prefetch is then enabled. The method 300 then continues from step 306. If the hot load or store is in the blacklist 406, then the method 300 proceeds from step 302 to step 306. In step 306, it is determined whether there are any more hot loads or stores that have not been considered in step 302. If there are, then the method 300 returns to step 302, whereas if there are not, then the method 300 ends at step 308.

Below are a number of examples of prefetches that can be enabled and disabled. In the first case, a prefetch instruction is associated with another instruction (not shown), in that the prefetch instruction prefetches data used by the other instruction. In the example code below, the first column contains the IP address of the instruction, the second column contains the predicate register (if any) and the third and fourth columns contain the instruction.

| | | | |
|---|---|---|---|
| 0x40000000001e47f0:0 | | sub | r8=r11,r14 |
| 0x40000000001e47f0:1 | | cmp.ne.or.aodom | p16,p17=42,r0 |
| 0x40000000001e47f0:2 | | sub | r17=r11,r14,1;; |
| 0x40000000001e4800:0 | | cmp.eq.unc | p7=r0,r8 |
| 0x40000000001e4800:1 | | mov.1 | ar.ec=2 |
| 0x40000000001e4800:2 | | nop.1 | 0x0;; |
| 0x40000000001e4810:0 | (p17) | lfetch | [r48] |
| 0x40000000001e4810:1 | (p17) | ld8.c.clr | r45=[r15] |
| 0x40000000001e4810:2 | (p16) | adds | r33=−8,r49 |

The prefetch instruction (lfetch) is located at 0x40000000001e4810:0. The predicate register p17 is associated with the prefetch instruction, meaning that the instruction will only be executed if p17 is 1, otherwise, if p17 is 0, the instruction will not be executed. In embodiments of the invention, for example, p17 is held at 0 and p16 is held at 1. Therefore, the instruction is enabled by modifying the instruction so that it is changed to:

0x40000000001e4810:0(p16)lfetch    [r48]

Therefore, the lfetch instruction will now be executed as the predicate register p16 is 1. To disable the prefetch instruction, the reverse is performed, and the instruction is modified such that its predicate register is p17.

In the next example, the code includes a post-incrementing prefetch instruction at 0x40000000001e3300:0, which prefetches data at pointer [r17] and then increments register r17 by the integer value 4.

| | | | |
|---|---|---|---|
| 0x40000000001e3300:0 | (p9) | lfetch | [r17],4 |
| 0x40000000001e3300:1 | (p9) | adds | r16=28,r16;; |
| 0x40000000001e3300:2 | | or | r8=r22,r8;; |

The prefetch is disabled by replacing the post-incrementing instruction with an incrementing instruction, such that it is replaced by the following instruction:

0x40000000001e3300:0(p9)add r17=r17,4

In the following example, the post-incrementing prefetch instruction at 0x40000000001e7cc0:0 includes an increment of the contents of register r23:

| | | | |
|---|---|---|---|
| 0x40000000001e7cc0:0 | (p7) | lfetch | [r8],r23;; |
| 0x40000000001e7cc0:1 | (p7) | ld1.c.clr | r2=[r8],r19 |
| 0x40000000001e7cc0:2 | (p7) | cmp4.ne.unc | p6=r0,r2 |

The prefetch is disabled by replacing the instruction with the following incrementing instruction:

0x40000000001e7ee0:0(p7)add r8=r8,r23;;

In the following example, there is a post-incrementing index load at 0x40000000003ae820:0:

| | | |
|---|---|---|
| 0x40000000003ae820:0 | ld8.s | r10=[r32],−8 |
| 0x40000000003ae820:1 | ld4 | r9=[r37] |
| 0x40000000003ae820:2 | mov | r73=r8 |

The prefetch in the post-incrementing index load is replaced by an incrementing instruction as follows to disable the prefetch:

0x40000000003ae820:0add r32=r32,−8

The above prefetches, once disabled, can be enabled again by performing the reverse of the disable operation. The annotations 408 may contain sufficient information to allow the monitoring application 404 to perform the enabling and/or disabling of the prefetches.

In alternative embodiments of the invention, prefetches can be added to the blacklist to indicate that they have been enabled. Therefore, once prefetches have been enabled, they can be prevented from being subsequently disabled. Additionally or alternatively, a prefetch that has been given a hint (see below with reference to FIG. 5) is indicated as such in the blacklist. Therefore, any prefetch that has been modified to disable it, enable it and/or provide it with a hint can be fixed so that the reverse of that operation is not carried out, and/or the prefetch is not subsequently modified.

Figure 5:
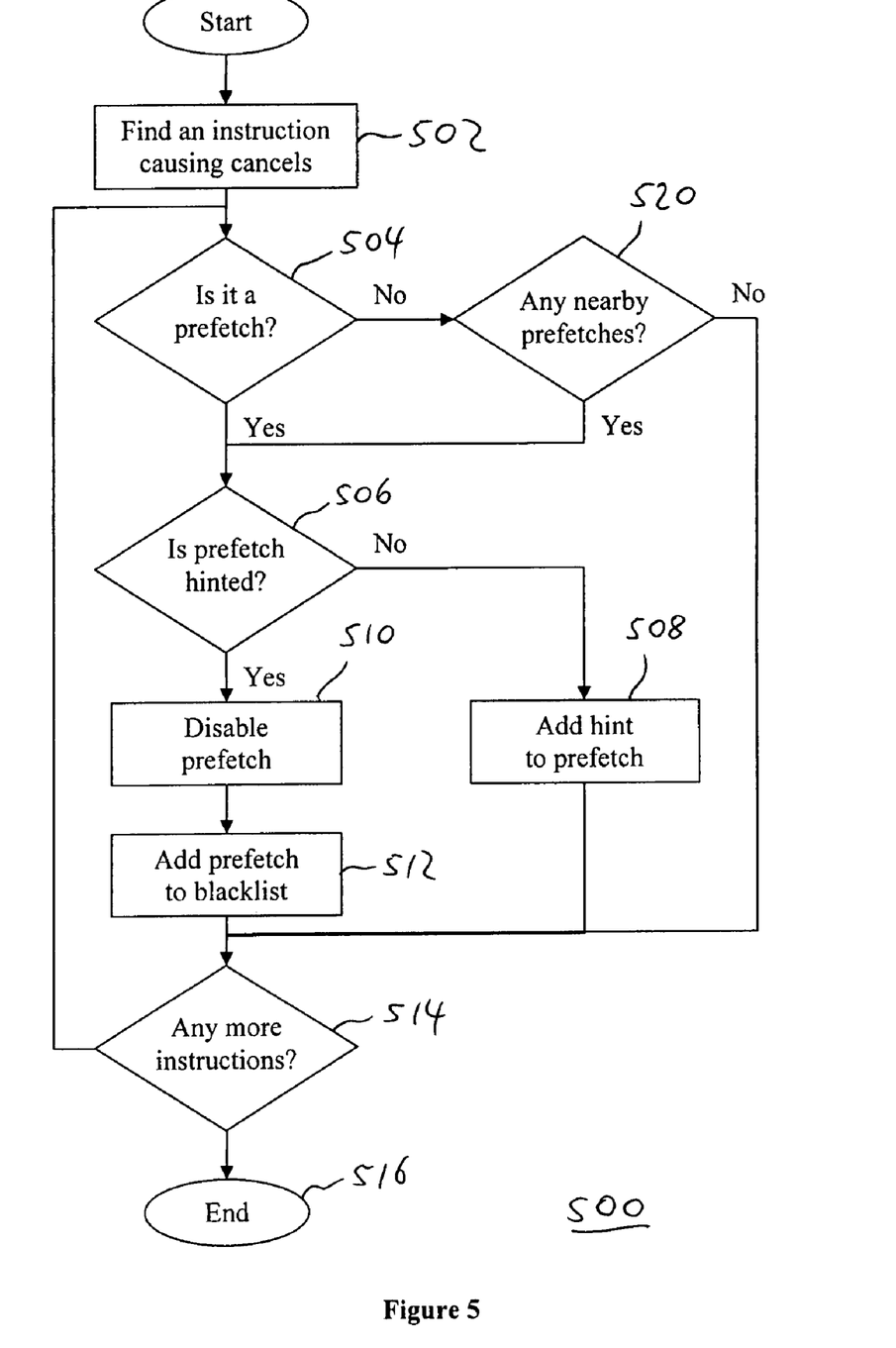
FIG. 5 shows an example of a method of processing OzQ cancels.

FIG. 5 shows an example of a method 500 of processing OzQ cancels. The method 500 starts at step 502 where an instruction causing excessive OzQ cancels (i.e. causing or contributing to cache congestion as indicated above) is found using the IP-EAR as described above. Then, in step 405, it is determined whether this instruction is a load or a prefetch. If the instruction is a prefetch instruction, then it should be disabled or reduced in effectiveness to try to ease cache congestion. If the instruction is a prefetch instruction, then the method 500 continues to step 506 where it is determined whether the prefetch is hinted, i.e. the prefetch instruction has a .nt1 hint. The .nt1 hint on a prefetch instruction loads the data into the L2D cache rather the L1D cache. This may ease cache congestion if, for example, the prefetched data is not required for some time, and/or the prefetched data contains floating point (FP) data which is loaded directly from the L2D cache, and/or it is intended to store data within the prefetched data, because a prefetch with a .nt1 hint does not displace data from the L1D cache. It can therefore be said that the prefetch with the .nt1 hint is reduced in effectiveness compared to a prefetch without the hint, as the prefetch instruction with the .nt1 hint does not prefetch data into the highest level of the cache hierarchy.

If the prefetch instruction is not hinted, as determined in step 506, then the method 500 proceeds to step 508 where a .nt1 hint is added to the prefetch instruction.

For example, the following code includes a post-incrementing prefetch instruction at 0x40000000003af609:0:

```
0x40000000003af690:0    1fetch              [r9],r40
0x40000000003af690:1    nop.m               0x0
0x40000000003af690:2    br.cloop.dpot.many  Py_ReprEnter+320;;
```

The prefetch instruction is replaced with the following to add the hint to the prefetch:

```
0x40000000003af690:01fetch.nt1[r9],r40
```

Other types of prefetch instruction can also be hinted in the same fashion.

If the method 500 determines at step 506 that the prefetch is already hinted, then the method 500 continues to step 510, where the prefetch is disabled, and then to step 512 where the prefetch is added to the blacklist 406 (shown in FIG. 4). The method proceeds from either step 508 or step 512 to step 514 where it is determined if there are any other instructions that cause cache congestion that were identified in the previous sample window. If there are further such instructions, then the method 500 returns to step 502 where another such instruction is found. If not, then the method 500 ends at step 516.

The method 500 may determine in step 504 that the instruction identified in step 502 is not a prefetch instruction. For example, the instruction may be a load or store instruction. If this is the case, then the identified instruction cannot be disabled. However, the method 500 proceeds from step 504 to step 520 where it is determined whether there are any prefetch instructions that are nearby the instruction identified in step 502, such as, for example, within 5 instructions. If there are, then disabling these prefetches may ease the cache congestion caused by the instruction identified in step 502. Therefore, the method proceeds from step 520 to step 506, where the nearby prefetch instruction or instructions is/are considered. If there are not nearby instructions, then the method 500 proceeds from step 520 to step 514.

Embodiments of the invention may hint and disable all prefetches found using the above method. In alternative embodiments of the invention, only those prefetches mentioned in the annotations 408 (shown in FIG. 4) may be hinted and disabled.

Embodiments of the invention may hint and/or disable all prefetches within a certain range of an instruction identified in step 502. For example, where there are multiple prefetches in a loop, it may be desirable to hint and/or disable all of these prefetches. Determining the bounds of a loop may be difficult, and so embodiments of the invention may hint and/or disable all prefetches within a certain number of instructions of the identified instruction as these prefetches may be within the same loop. In other embodiments of the invention, the prefetches within a certain range of an identified instruction are hinted or disabled one by one, disabling the prefetch with the lowest latency first (as this prefetch is the least useful compared to other prefetches). If the same instruction is identified in step 502 in another sample window then the prefetch with the next lowest latency is hinted or disabled, and so on. In this way, the cache congestion is more slowly eased to try to find a point of high prefetch use with low OzQ cancels (and, therefore, low cache congestion).

The executing application is compiled such that it contains prefetches. There are a number of approaches for including prefetches within a compiled application. For example, prefetches may be added in loops that access arrays. Prefetches may also be added in response to a second compilation of an application whereby the first compilation was executed for a period of time in a performance monitoring environment to identify candidate instructions for prefetches. The executing application, when compiled, may include all prefetches disabled, all prefetches enabled, or a mixture of enabled and disabled prefetches (such as, for example, random prefetches disabled, all load prefetches disabled and/or any other method of choosing enabled and disabled prefetches). The prefetches that are intended for enabling, disabling, and hinting (which may be, for example, all prefetches or selected prefetches) can be included in the annotations along with details as to how to enable and disable the prefetches as indicated above.

Embodiments of the invention may program and/or read data from the PMU directly. However, the perfmon( ) system call may be used as an alternative to program and/or read from the PMU. Additionally or alternatively, the trace( ) system call may be used to modify instructions within the executing application. These system calls are available from, for example, the HP-UX operating system, although other operating systems may be used, which may provide alternative system calls.

Figure 6:
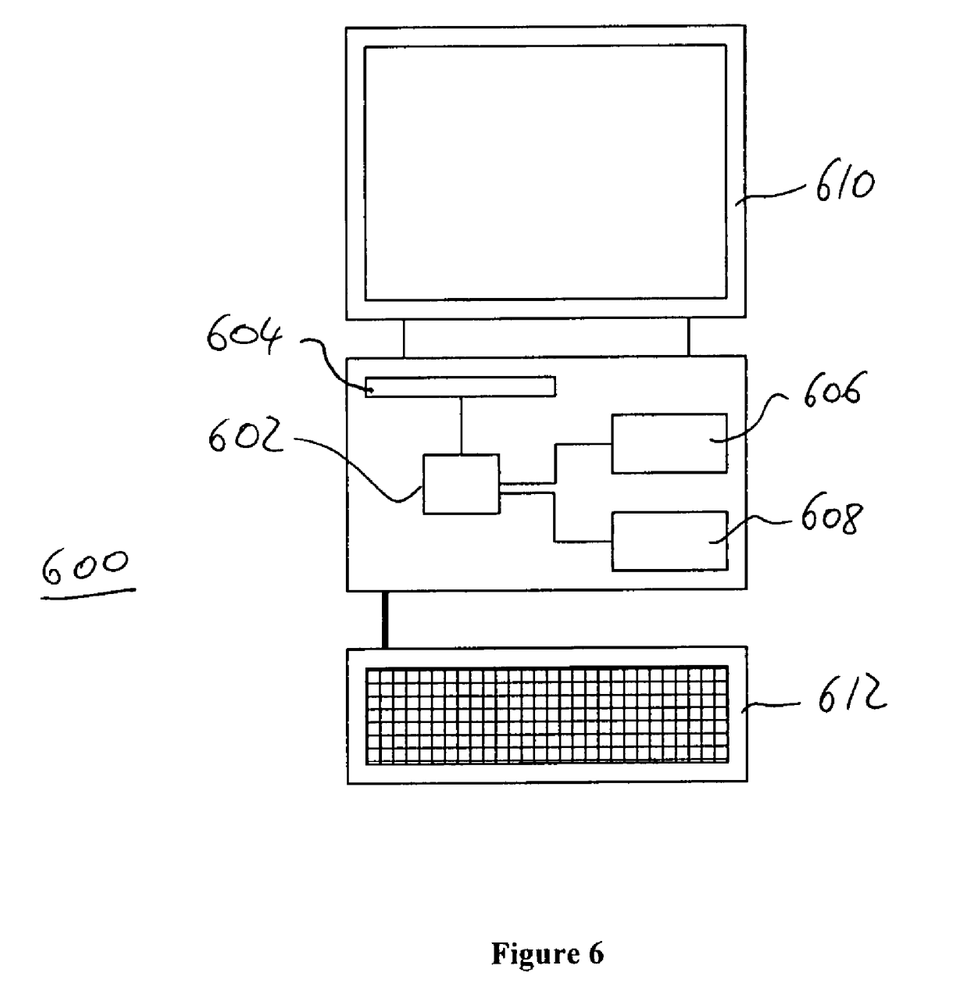
FIG. 6 shows an example of a data processing system.

FIG. 6 shows an example of a data processing system 600 that includes a data processor 602. The data processor 602 may be, for example, a Montecito processor, or some other type of processor. The system 600 may also include other identical or non-identical data processors. The system 600 also includes system memory 604, an may include a permanent storage device 606 such as, for example, a hard disk, and/or a communications device 608 for communicating with an external wired and/or wireless network such as, for example, a LAN, WAN and/or internet. The data processing system 600 may also include a display device 610 and/or an input device 612 such as a mouse and/or keyboard.

The executing application and/or the monitoring application may be executing on the data processing system 600. In alternative embodiments of the invention, the executing application and the monitoring application may be executing on different data processing systems.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of modifying an executing application, the method comprising:
    monitoring the executing application to identify at least one of a hot load instruction, a hot store instruction and an active prefetch instruction that contributes to cache congestion;
    where the monitoring identifies a hot load instruction or a hot store instruction,
        determining whether the identified hot load instruction or hot store instruction is found in a blacklist, wherein the blacklist includes a list of prefetches that are not to be enabled as they contribute to the cache congestion;
        if not, enabling at least one prefetch associated with the hot load instruction or the hot store instruction; and
        if so, repeating the steps of monitoring and determining for a next hot load instruction or a hot store instruction; and
    where the monitoring identifies an active prefetch instruction that contributes to cache congestion, performing one of disabling the active prefetch instruction and reducing the effectiveness of the active prefetch instruction.

2. A method as claimed in claim 1, wherein identifying a hot load instruction comprises identifying a load instruction that causes at least a threshold amount of load latency cycles caused by the executing application.

3. A method as claimed in claim 1, wherein identifying a hot store instruction comprises identifying a store instruction that causes at least a threshold amount of store latency cycles caused by the executing application.

4. A method as claimed in claim 1, wherein monitoring the executing application comprises taking a sample from a performance monitor after a predetermined number of events caused by the executing application, and analyzing the samples after a predetermined number of samples have been taken to identify at least one of a hot load instruction, a hot store instruction and an active prefetch instruction that contributes to cache congestion.

5. A method as claimed in claim 4, wherein the events comprise at least one of cache miss events and cache congestion events.

6. A method as claimed in claim 1, wherein enabling a prefetch associated with a hot load instruction comprises at least one of:
    where the hot load instruction is associated with a prefetch instruction, enabling the prefetch instruction;
    where the hot load instruction is an incrementing instruction, replacing the incrementing instruction with one of a post incrementing prefetch instruction and a post incrementing index load.

7. A method as claimed in claim 1, wherein enabling a prefetch associated with a hot store instruction comprises enabling a prefetch instruction associated with the hot store instruction.

8. A method as claimed in claim 1, wherein enabling at least one prefetch associated with the hot load instruction comprises consulting a data structure to identify a prefetch associated with the hot load instruction, and enabling the identified prefetch.

9. A method as claimed in claim 1, wherein enabling at least one prefetch associated with the hot store instruction comprises consulting a data structure to identify a prefetch associated with the hot store instruction, and enabling the identified prefetch.

10. A method as claimed in claim 1, wherein reducing the effectiveness of an active prefetch instruction comprises modifying the active prefetch instruction such that it prefetches data into a cache level other than a highest cache level.

11. A method as claimed in claim 1, wherein disabling an active prefetch instruction comprises at least one of:
    where the active prefetch instruction is associated with a load instruction, disabling the active prefetch instruction;
    where the active prefetch instruction is a post incrementing prefetch instruction, replacing the active prefetch instruction with an incrementing instruction; and
    where the active prefetch instruction is a post incrementing index load, replacing the active prefetch instruction with an incrementing instruction.

12. A system comprising:
    a processor;
    memory coupled to the processor, wherein the memory includes a computer program for modifying an executing application, the computer program comprising:
    code for monitoring the executing application to identify at least one of a hot load instruction, a hot store instruction and an active prefetch instruction that contributes to cache congestion;
    code for determining whether an identified hot load instruction or hot store instruction is found in a blacklist where the monitoring identifies the hot load instruction or the hot store instruction, wherein the blacklist includes a list of prefetches that are not to be enabled as they contribute to the cache congestion;
        if not, code for enabling at least one prefetch associated with the hot store instruction or the hot store instruction; and
        if so, code for repeating the steps of monitoring and determining for a next hot load instruction or a hot store instruction; and
    code for performing one of disabling an active prefetch instruction and reducing the effectiveness of the active prefetch instruction where the monitoring identifies the active prefetch instruction that contributes to cache congestion.

13. A system as claimed in claim 12, wherein the code for monitoring the executing application comprises code for identifying a hot load instruction comprising a load instruction that causes at least a threshold amount of load latency cycles caused by the executing application.

14. A system as claimed in claim 12, wherein the code for monitoring the executing application comprises code for identifying a hot store instruction comprising a store instruction that causes at least a threshold amount of store latency cycles caused by the executing application.

15. A system as claimed in claim 12, wherein monitoring the executing application comprises taking a sample from a performance monitor after a predetermined number of events caused by the executing application, and analyzing the samples after a predetermined number of samples have been taken to identify at least one of a hot load instruction, a hot store instruction and an active prefetch instruction that contributes to cache congestion, wherein the events comprise at least one or cache miss events, cache congestion events and other events.

16. A system as claimed in claim 12, wherein the code for enabling at least one prefetch associated with the hot load instruction comprises code for consulting a data structure to identify a prefetch associated with the hot load instruction, and enabling the identified prefetch.

17. A system as claimed in claim 12, wherein the code for enabling at least one prefetch associated with the hot store instruction comprises code for consulting a data structure to identify a prefetch associated with the hot store instruction, and enabling the identified prefetch.

18. A system as claimed in claim 12, comprising code for reducing the effectiveness of an active prefetch instruction by modifying the active prefetch instruction such that it prefetches data into a cache level other than a highest cache level.

19. A computer readable storage medium storing a computer program comprising codes that, when executed by a computer, cause the computer to perform a method comprising:

monitoring the executing application to identify at least one of a hot load instruction, a hot store instruction and an active prefetch instruction that contributes to cache congestion;

where the monitoring identifies a hot load instruction or a hot store instruction,
determining whether the identified hot load instruction or hot store instruction is found in a blacklist, wherein the blacklist includes a list of prefetches that are not to be enabled as they contribute to the cache congestion;
if not, enabling at least one prefetch associated with the hot load instruction or the hot store instruction; and
if so, repeating the steps of monitoring and determining for a next hot load instruction or a hot store instruction; and where the monitoring identifies an active prefetch instruction that contributes to cache congestion, performing one of disabling the active prefetch instruction and reducing the effectiveness of the active prefetch instruction.

* * * * *